Sept. 18, 1934.   R. B. BUKOLT   1,973,746
TOY VEHICLE
Filed Oct. 19, 1928

INVENTOR.
Roman B. Bukolt
Erwin, Wheeler & Woolard
ATTORNEYS

Patented Sept. 18, 1934

1,973,746

UNITED STATES PATENT OFFICE 1,973,746

TOY VEHICLE

Roman B. Bukolt, Stevens Point, Wis.

Application October 19, 1928, Serial No. 313,414

3 Claims. (Cl. 155—22)

This invention relates to improvements in toy vehicles.

It is one of the objects of the present invention to provide a vehicle which may be variously assembled to adjust one of its parts to a position where it will function as a foot rest or to another position where it will function as a bumper.

It is a further object of the invention to provide a vehicle having a seat portion readily adjustable as to height and provided with different means of adjustment for its front and rear ends, whereby to provide for the different forms of wheeled supports used at the respective ends of the vehicle.

It is a further object of the invention to provide a novel and improved back rest and confining ring for supporting a young child upon the seat portion thereof.

It is also my purpose to provide a novel and improved construction whereby the handle is adapted either to be grasped by a child operating the vehicle for itself or adapted to serve as an anchorage for a handle extension, by means of which an adult may pull the vehicle.

In the drawing—

Figure 2 is a fragmentary detail from a similar viewpoint showing the reversed position of the front supporting post axle and bumper or foot rest;

Figure 3 is a detail in plan of the extension handle;

Figure 4 is a detail in side elevation of the rear end of the vehicle showing its axle in section and illustrating in dotted lines the various adjustments which are possible;

Like parts are identified by similar reference numerals throughout the several views.

Figure 1:
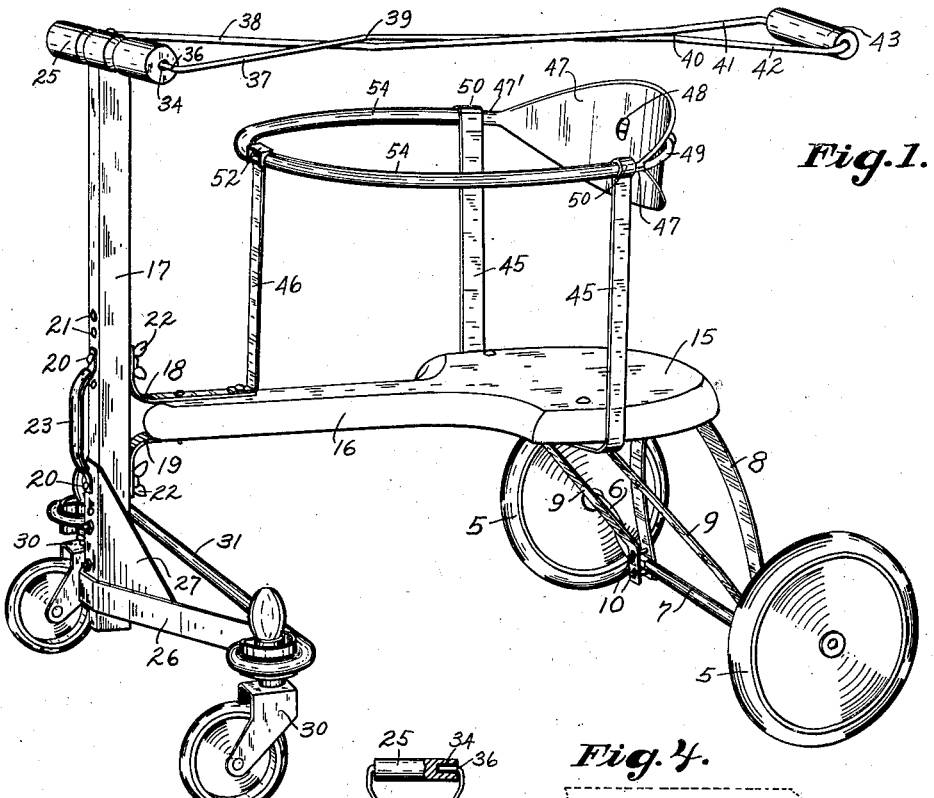
Figure 1 is a view in perspective of a toy vehicle embodying this invention.

The rear wheels 5 are rotatably mounted upon the crank-like end portions 6 of a rear axle 7 which is squared, as shown in Figure 4, at the points of engagement therewith of the legs of the U-shaped seat support 8 and the braces 9. It will be noted that each brace is bolted to one of the legs of the seat support 8 at each side of the squared axle by means of bolts 10 whereby the axle is clamped between the braces and support to secure it against rotation.

It will be obvious that this arrangement permits of the adjustment of axle 7 to angular positions adapted to provide a plurality of levels at which said support and braces will be carried. In Figure 1 the crank portions 6 of the axle extend upwardly therefrom, whereby the seat supporting and brace elements are at their lowest level with respect to the wheels. A similar relation of the parts is illustrated in full lines in Figure 4 in which view I have also shown the parts adjusted to two other possible positions in one of which the axle 7 is shown in dotted lines at the level of the wheel axes and immediately at the rear thereof, while in the third position the intermediate portion of the axle is directly above the axes of the wheels. It will be apparent that by loosening bolts 10, adjusting the axle to the desired angular position and then tightening bolts 10 it is possible to determine the level of the rear end of the seat 15 of the vehicle.

The vehicle seat is provided with an elongated forward extension 16 which terminates short of the front post 17 of the vehicle and is detachably connected therewith by the fittings 18 and 19 which are apertured to receive bolts 20 selectively engageable in a number of openings 21 in the front post 17 and preferably provided with wing nuts 22. The heads of the bolts serve to secure to the front of post 17 a bumper 23 which will cushion encounters of the vehicle with furniture which is too high to be struck by the combined bumper and foot rest hereinafter to be described. Bumper 23 may also be used as a handle by which an adult may carry the vehicle. The ends of the bumper or handle 23 may be used in place of washers to prevent the heads of bolts 20 from abrading the wood of which front post 17 is shown to be constructed.

Although the front post 17 is extended upwardly and provided with a transverse handle at 25, it is not dirigible and it carries rigidly the strap iron axle member 26 which is connected thereto and braced therefrom by means of the sheet metal brace 27 which is of general triangular form and, like the axle member 26, is bent rearwardly when the parts are disposed as shown in Figure 1.

The axle 26 is composed of two strap iron arms which are not in alignment but are arranged to project forwardly of the front post 17 in the Figure 2 position thereof and rearwardly when the post is reversed, as shown in Figure 1. The extremities of axle 26 are helically curled to receive the shanks of caster wheels 30 which permit the child to control the direction of movement of the vehicle without requiring a dirigible axle.

Extending transversely between the extremities of the axle member 26 is a rubber covered rod 31 which in the Figure 1 position of the parts serves as a foot rest for the child to use when coasting and in the Figure 2 position of the parts serves as a bumper which is adapted to protect furniture from injury such as might be occasioned by the unprotected ends of the axle 26. It will be observed that the rubber covered wire passes about the curled ends of the axle 26 and the wire extends through an aperture in the axle and is bent to maintain its engagement in such aperture, as shown at 32 in Figure 2. The ends of the axle are thereby protected by the rubber in both of the axle positions illustrated and the arrangement is such that the wire braces and reinforces the axle to comprise a triangular figure therewith when viewed in plan.

The adjustment of the front post 17 with its associated axle and bumper or foot rest 31 is accomplished by unscrewing the wing nuts 22 and bodily reversing the parts. In the course of this adjustment the height of the front end of the vehicle may be regulated as desired to correspond with any adjustment effected at the rear end of the vehicle. The front adjustment is provided by the alternative selection of any one of the various apertures 21 in the front post.

In order to facilitate the handling of the vehicle by a person or child not riding therein, I have provided apertures at 34 in the end of the handle 25 fixed to the front post 17. These apertures loosely receive the inwardly directed and aligned ends 36 of two pieces of heavy wire 37 and 38 which converge together from the ends of handle 25 to the point designated at 39 in Figure 3. From this point to the point designated at 40 the wires are generally parallel but are twisted about each other for one complete rotation. Thence they diverge as at 41 and 42 to a relatively fixed anchorage in the auxiliary handle member 43.

The arrangement is such that the extremities 36 of the two wires may readily be manipulated, due to the flexibility of the wires, into and out of engagement in apertures 34 of the principal handle 25. When the wires are removed from sockets 36 the vehicle is left unencumbered by the extension handle which is then wholly detached. Only a moment is required, however, to re-engage the ends of the wires 37 and 38 in the principal handle 25 to establish connection of the auxiliary handle therewith. The twist in the wires and their relatively permanent connection within the secondary handle 43 serves to maintain the handle parts in operative relation when disengaged from the vehicle.

Figure 5:
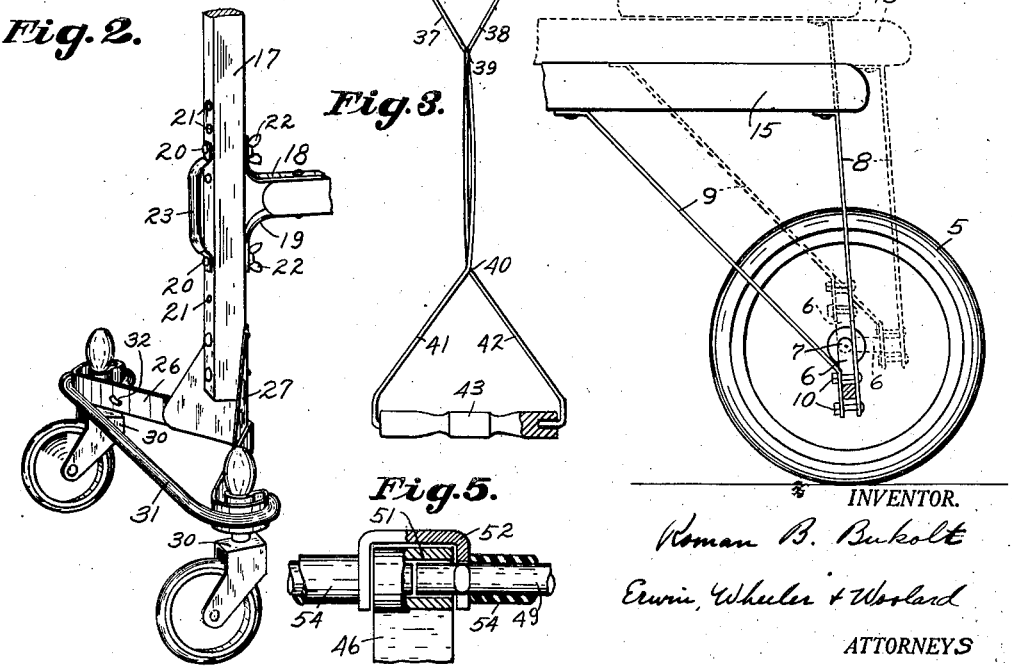
Figure 5 is a fragmentary detail partially in front elevation and partially in section of the front bracket and the hoop supported thereby.

The bolts which anchor braces 9 to seat 15 also secure to the under side of the seat the bracket elements 45 which are vertically disposed at either side thereof. A third bracket 46 is mounted at the front of the seat upon its narrow portion 16 or is otherwise supported from the front post 17. A back for the seat is provided by a sheet metal stamping 47 pressed outwardly at 48 to receive a wire 49 which passes through eyes 50 formed by reversely bending the ends of brackets 45 back upon themselves. The seat back 47 tapers toward its side portions and is also formed about the wire at 47'. The ends of the wire are carried forwardly and abut within a similar eye 51 formed in bracket 46, as shown in Figure 5. A C-shaped clamp 52 has its ends apertured to receive the ends of the wire 49 and is compressed thereon to anchor the wire in place. This construction leaves no exposed ends and provides a comparatively rigid support not only for the back of the seat but also a support in the form of a ring which prevents a small child from falling forwardly.

The entire supporting structure including brackets 45 and 46, seat back 47, and the guard ring 49 may readily be removed from the vehicle as the child develops to a stage where the protection thus afforded is unnecessary. The wire 49 is preferably covered with a rubber tube 54 between bracket 46 and each of brackets 45.

I claim:

1. In a device of the character described, the combination of an axle provided with offset portions and a squared intermediate portion, wheels upon said offset portions, a seat, a U-shaped seat support having two legs abutting a squared portion of said axle, and brace means connected with said seat and clampingly connected with the legs of said seat support in engagement with said axle, whereby to be adapted to retain the intermediate portion of the axle in a fixed angular position of adjustment.

2. In a vehicle of the character described, the combination with a body comprising a seat and a narrow forward extension thereof, of a wheeled support for said seat, a bracket connected to said extension, a post connected with said bracket, a strap extending transversely of said post and providing an axle, said strap being provided with a triangular sheet metal base connected thereto and to said post, eyes formed in the end of said axle, casters in said eyes, and a rod formed about said eyes anchored in the portions of said axle immediately adjacent thereto and extending thence between said eyes in spaced relation to said post.

3. In a vehicle of the character described, the combination with a body comprising a seat and a narrow forward extension thereof, of a wheeled support for said seat, a bracket connected to said extension, a post connected with said bracket and adjustably connectible thereto at various levels, a strap extending transversely of said post and providing an axle, bracing means suitably locating said strap relatively to said post, eyes formed in the ends of said axle, and supporting casters dirigibly mounted in said eyes.

ROMAN B. BUKOLT.